(12) United States Patent
Warsop et al.

(10) Patent No.: US 8,143,689 B2
(45) Date of Patent: Mar. 27, 2012

(54) SENSOR DEVICE

(75) Inventors: Clyde Warsop, Lydney (GB); Andrew Julian Press, Bradley Stoke (GB); Martyn John Hucker, Cleeve (GB)

(73) Assignee: BAE Systems PLC, London (GB)

( * ) Notice: Subject to any disclaimer, the term of this patent is extended or adjusted under 35 U.S.C. 154(b) by 1142 days.

(21) Appl. No.: 11/597,280

(22) PCT Filed: Sep. 19, 2006

(86) PCT No.: PCT/GB2006/050295
§ 371 (c)(1), (2), (4) Date: Nov. 21, 2006

(87) PCT Pub. No.: WO2007/034240
PCT Pub. Date: Mar. 29, 2007

(65) Prior Publication Data
US 2009/0230499 A1 Sep. 17, 2009

(30) Foreign Application Priority Data

Sep. 20, 2005 (EP) .................................... 05255795
Sep. 20, 2006 (GB) .................................... 0519183.8

(51) Int. Cl.
*H01L 31/058* (2006.01)
(52) U.S. Cl. ......... 257/467; 257/E29.166; 257/E21.499; 438/55; 438/48; 438/53; 438/54; 73/204.26
(58) Field of Classification Search .................. 257/419, 257/108; 438/48, 50; 250/338
See application file for complete search history.

(56) References Cited

U.S. PATENT DOCUMENTS

| 4,888,988 | A | * | 12/1989 | Lee et al. ................... 73/204.26 |
| 5,108,193 | A | * | 4/1992 | Furubayashi ................. 374/164 |
| 5,722,288 | A |  | 3/1998 | Manaka |
| 6,032,527 | A | * | 3/2000 | Genova et al. ............. 73/204.26 |
| 6,750,452 | B1 | * | 6/2004 | Morita ........................ 250/338.1 |
| 6,794,981 | B2 | * | 9/2004 | Padmanabhan et al. ........ 338/25 |
| 2002/0148289 | A1 |  | 10/2002 | Isogai et al. |
| 2002/0187560 | A1 | * | 12/2002 | Pezzuto et al. ................ 436/180 |
| 2003/0159505 | A1 |  | 8/2003 | Konzelmann et al. |

(Continued)

FOREIGN PATENT DOCUMENTS

DE    100 08 988 A1    8/2001

(Continued)

OTHER PUBLICATIONS

Partial European Search Report dated Feb. 9, 2006.

(Continued)

*Primary Examiner* — David E. Graybill
*Assistant Examiner* — Mark A Laurenzi
(74) *Attorney, Agent, or Firm* — Buchanan Ingersoll & Rooney PC

(57) ABSTRACT

A sensor device for sensing air flow speed at the exterior of an aircraft, comprising a substrate having an upper side on which is mounted a diaphragm over an aperture or recess in the substrate, the diaphragm being thermally and electrically insulative, and mounting on its upper surface a heating element comprising a layer of resistive material, and wherein electrical connections to the heating element are buried in the diaphragm and/or the substrate, and provide electrical terminals at the lower side of the substrate. The heating element is exposed to the environment, but the remaining electrical parts of the device are not exposed.

21 Claims, 9 Drawing Sheets

U.S. PATENT DOCUMENTS

2005/0139967 A1 6/2005 Eskridge et al.

FOREIGN PATENT DOCUMENTS

| EP | 1 008 837 A1 | 6/2000 |
| EP | 1 227 326 A2 | 7/2002 |
| EP | 1 284 412 A1 | 2/2003 |
| WO | 03/060434 A1 | 7/2003 |
| WO | 03/098161 A2 | 11/2003 |
| WO | 2005/029006 A2 | 3/2005 |
| WO | 2005/029008 A2 | 3/2005 |
| WO | 2005/055311 A3 | 6/2005 |

OTHER PUBLICATIONS

Search Report dated Nov. 28, 2005.
Search Report dated Jun. 12, 2006.

\* cited by examiner

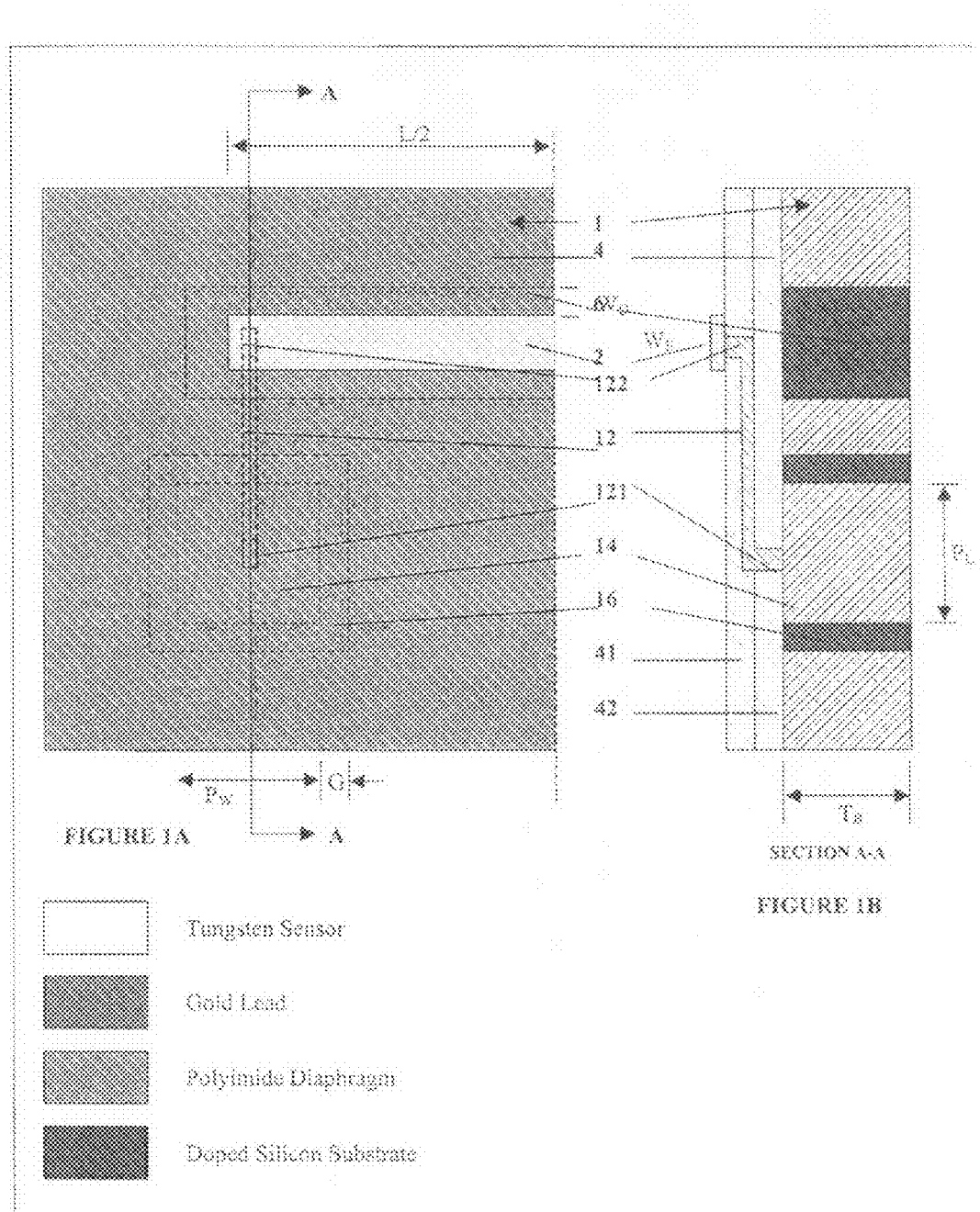

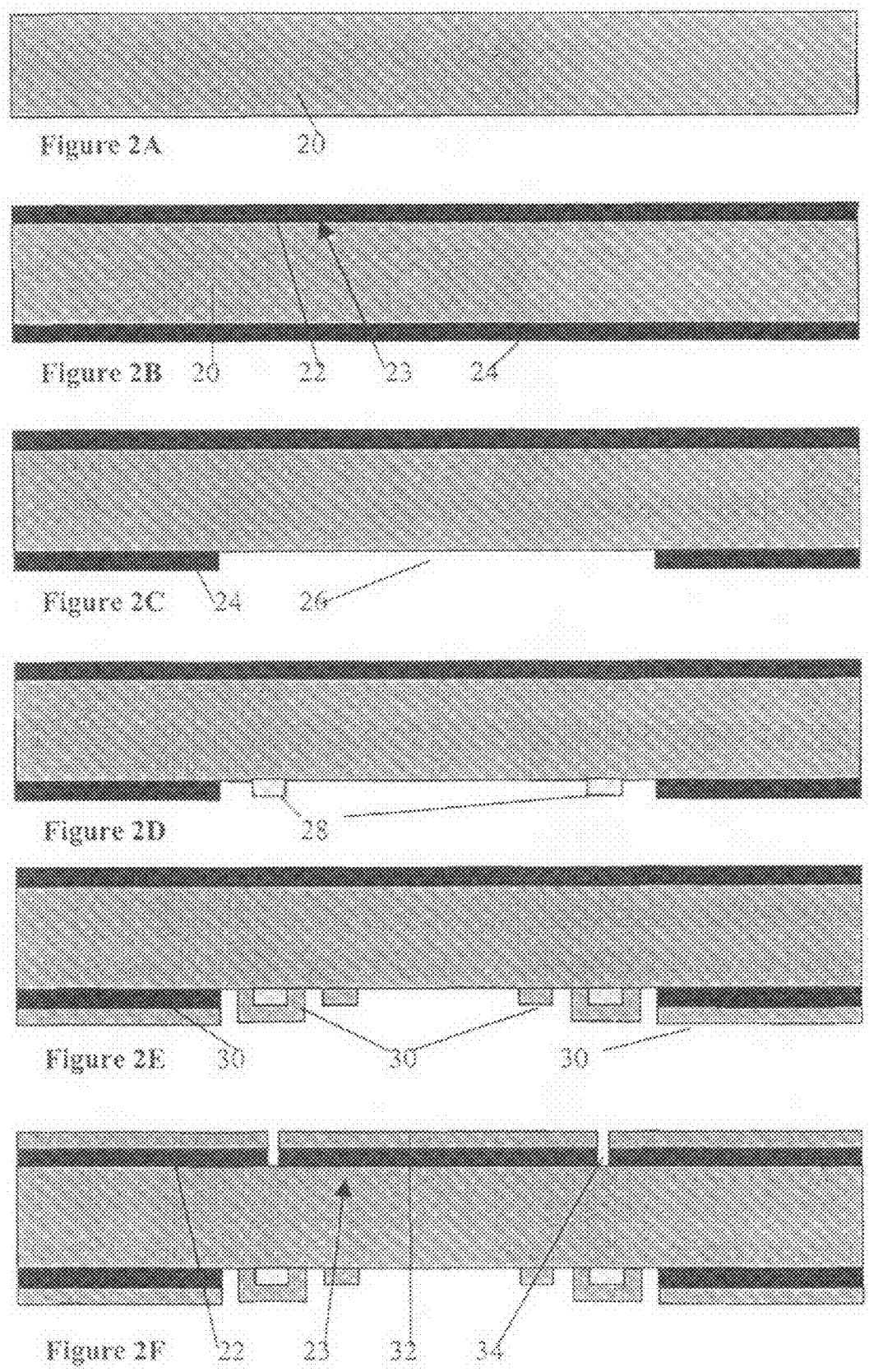

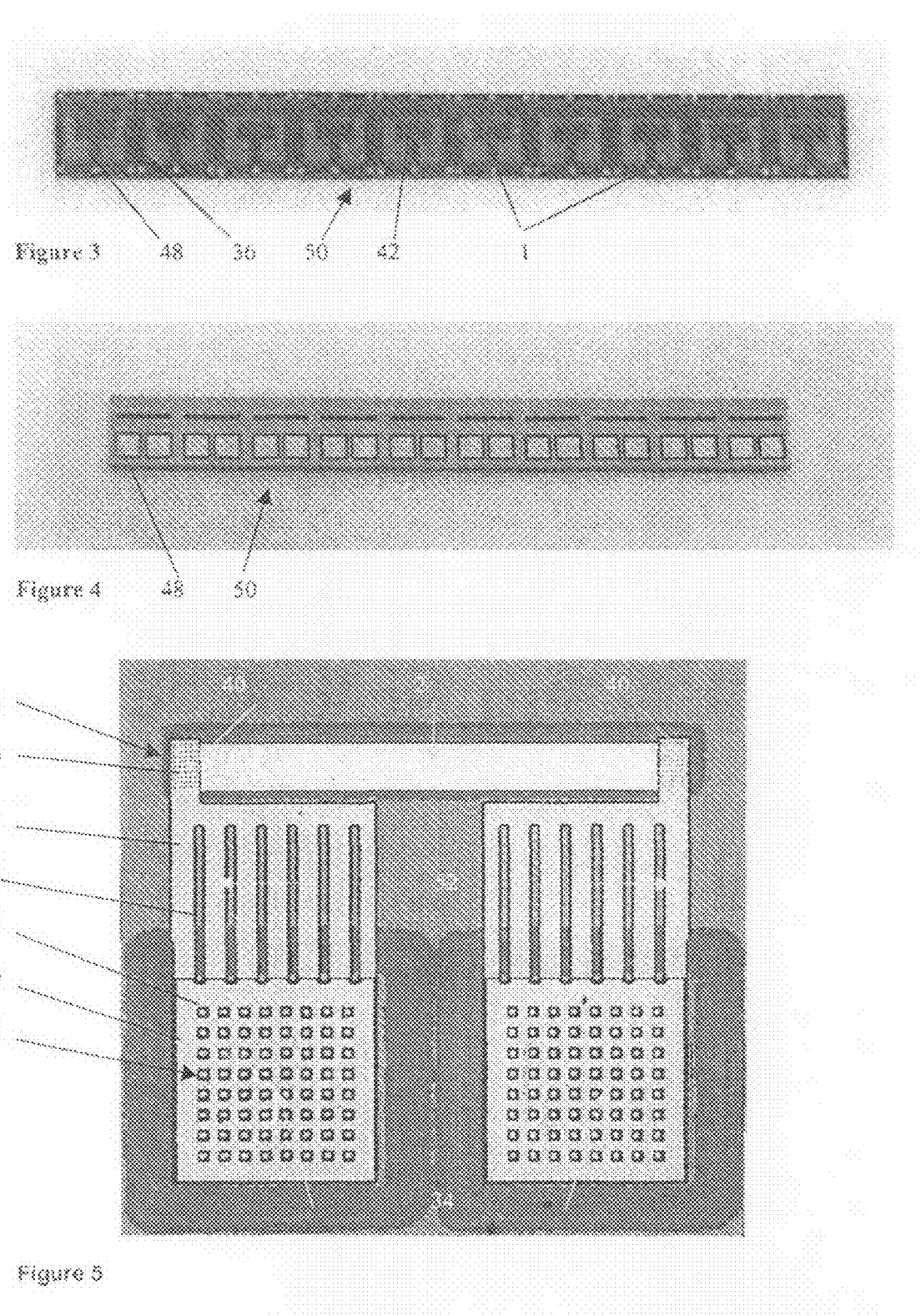

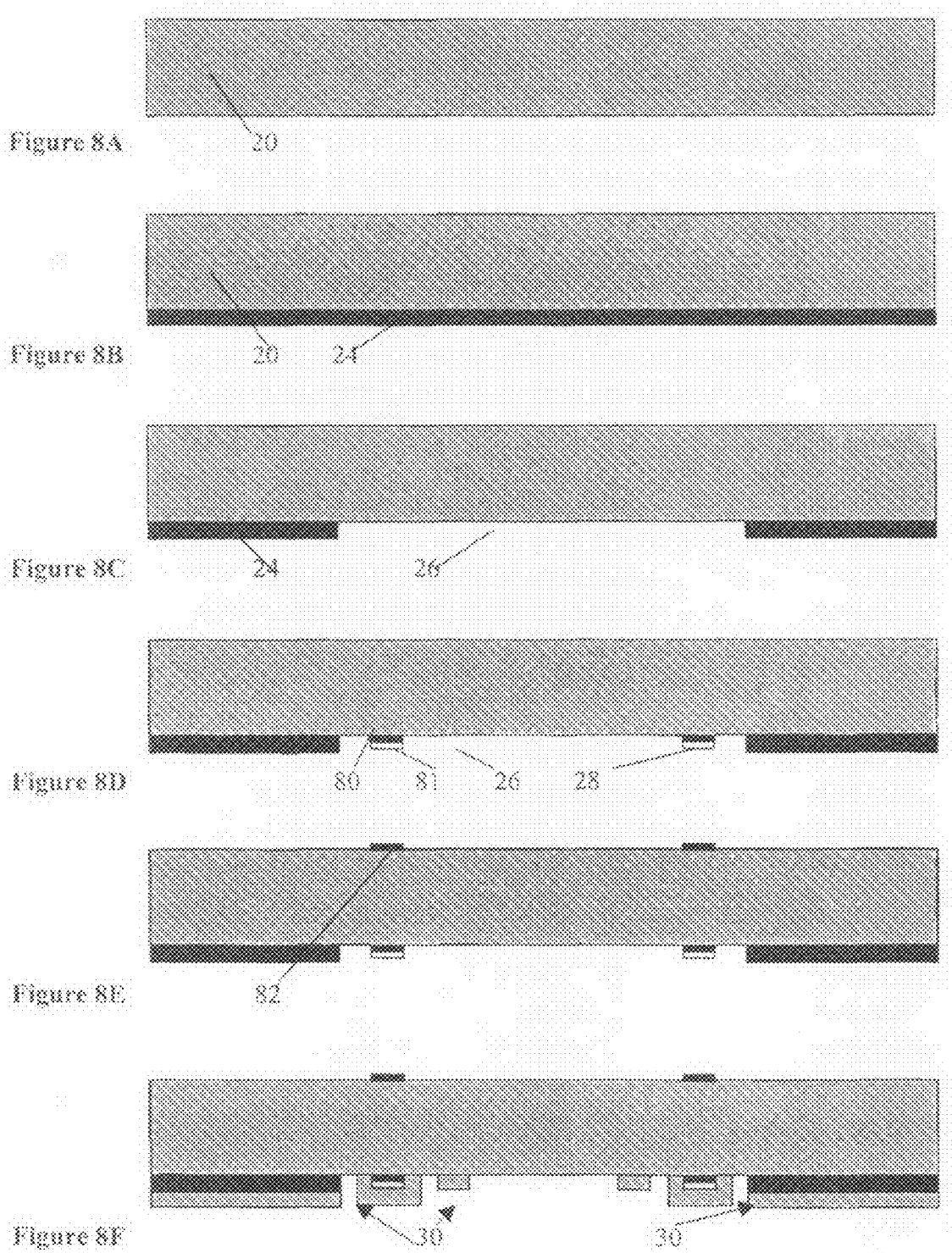

SENSOR DEVICE

FIELD OF THE INVENTION

The present invention relates to a sensor device and a method of making a sensor device, employing techniques of microfabrication, and particularly though not exclusively, a sensor device employing a heated element for sensing a variable such as aircraft wind speed.

BACKGROUND OF THE INVENTION

Anemometry devices for measuring wind speed by exposure of an electrically heated element to air flow are known. For example devices have been used in wind tunnels comprising a wire suspended between upstanding terminals. The wire is electrically energised and is mounted in a bridge circuit to monitor changes of resistance arising from changes in temperature of the element (via the temperature coefficient of resistance) when the wind speed changes. However such devices are not suitable for an aircraft in service, since they are fragile. In order to measure the wind speed of an aircraft, a device is required that is resistant to knocks and abrasions.

It has been proposed to employ MEMS hot film sensors applied to an aircraft fuselage, which include a titanium layer serving as a heating element, mounted on a polyimide layer—see FIG. 9 of Warsop, C.: "AEROMEMS—An Investigation into the Viability of MEMS Technology for Boundary Layer Control"; presented at the American Institute of Aeronautics and Astronautics (AIAA) Applied Aerodynamics Conference, held in Norfolk, Va., USA; AIAA paper No. AIAA-99-3173; June 1999. However, such proposal was at an initial stage of development, and further improvements are desirable.

SUMMARY OF THE INVENTION

It is an object of the invention to provide a sensor device made with microfabrication techniques having a heated sensor element wherein heat loss from the element to surrounding parts is reduced.

It is a further object of the invention to provide a sensor device for use in a hazardous environment wherein a sensor element is exposed to the hazardous environment, but wherein electrical connections to the element are positioned internally of the sensor.

The concept of the invention is to provide a sensor device fabricated by techniques of microfabrication (in the art, such techniques are generally referred to as MEMS technology). A heating element is formed as a resistive film or layer that may be exposed to a hazardous environment, and is for example mounted flush with the surface of an aircraft's fuselage. Electrical connections to the heating (resistive) element are made through a substrate on which the heating element is mounted, to the rear side of the substrate. In order to reduce heat loss from the element to the adjacent parts of the device, and to maintain sensitivity of the device, the following measures are involved:

1. The resistive element is mounted on a thin diaphragm that is suspended over an aperture in the substrate.
2. The diaphragm is of a layered construction, with a main load bearing layer of for example insulative polymer, covered by an abrasion resistant and insulative layer such as $SiO_2$.
3. Electrical conductors extend within the diaphragm to contacts on the resistive element by means of the layered construction of the diaphragm.
4. Electrical contacts between the resistive element and the conductors are provided by an array of small through vias that restrict the flow of heat from the resistive element.
5. At the remote ends of the conductors, the substrate is cut away, preferably by an etching technique (such as deep reactive ion etching) to form stand alone conductive pillars extending from the conductors and forming electrical terminals at their lower ends.
6. Electrical contacts between the conductive pillars and the conductors are provided by an array of small through vias.

In a first aspect, the invention provides a sensor device comprising a substrate having an upper side on which is mounted a diaphragm over an aperture or recess in the substrate, the diaphragm being thermally and electrically insulative, and mounting on its upper surface a heating element comprising a layer of resistive material, and wherein electrical connections to the heating element are buried in the diaphragm and/or the substrate, and provide electrical terminals at the lower side of the substrate.

In a second aspect, the invention provides a sensor device comprising a substrate formed of electrically conductive material and having a sensor element formed on an upper side, and electrical terminals on the lower side of the substrate, the electrical terminals being connected to the sensor element by electrically conductive means, and wherein said terminals are provided by at least one conductive pillar formed by cutting away substrate material so as to provide said at least one conductive pillar, extending from the upper part of the substrate side to the lower substrate side.

In a third aspect, the invention provides a method of forming a sensor device, comprising: providing a substrate formed of electrically conductive material and forming a sensor element formed on an upper side of the substrate; forming electrical terminals on the lower side of the substrate that are connected to the sensor element by electrically conductive means, and cutting away substrate material so as to provide at least one conductive pillar, extending from the upper part of the substrate side to the lower substrate side, said at least one conductive pillar providing said terminals.

Preferably, the heating element is formed of tungsten or nickel.

Optionally, the diaphragm includes a layer of polymer material, low density composites, spin-on nano-porous glasses or aerogels, for example hydrophobic silica aerogels.

Optionally, the diaphragm comprises a plurality of layers, an uppermost layer being an abrasion resistant material such as silicon dioxide.

Conveniently, the diaphragm comprises a plurality of layers, and electrical conductor means being mounted between the layers and extending from the heating element. Optionally, the electrical conductor means are slotted.

Advantageously, the heating element is coupled to electrical conductor means disposed beneath the surface of the diaphragm by an array of vias that extend from the heating element through the diaphragm to the electrical conductor means. Optionally, a cap layer of electrically conductive material may be formed over the vias.

Conveniently, the terminals of the sensor device are provided by at least one conductive pillar formed by cutting away substrate material so as to provide said at least one conductive pillar, extending from the upper part of the substrate to the lower substrate side. Optionally, the or each pillar is connected to electrical conductor means at the upper part of the substrate by an array of vias.

Conveniently, each via is elongated in plan. The substrate of the device is conveniently formed of strongly doped silicon. Further, the aspect ratio of the heating element is envisaged to be 10 or more. The thickness of the diaphragm is envisaged to be between 4 and 10 microns, preferably 6 microns.

At least in a preferred embodiment, the sensor is a rectangular sensing element, comprising a film of Tungsten, supported on a 6 μm thickness silicon oxide/polyimide/silicon oxide diaphragm to reduce heat losses to the substrate. Reliable electrical connections to the back side of the sensor are addressed using a novel interconnect system. Heat loss is further reduced as the interconnects are thermally isolated from the substrate. The leads running from the sensing element are buried between the diaphragm layers to improve robustness and reduce lead convective losses. This has resulted in a significant improvement in performance. Sensitivity is increased to 950 mV/Pa and frequency response is increased to at least 20 kHz. Substantial reductions in parasitic resistance have allowed power consumption per device to be less than 10 mW under static conditions rising to around 350 mW at a free stream velocity of 240 m/s. The flexible layout of the design coupled with a common device footprint allowed a range of integration methods to be evaluated along with a variety of sensor element configurations.

The sensor element preferably for simplicity in manufacture has constant width along its entire length. Alternatively the sensor width may be varied such that the width is greater in the centre than at the ends. The purpose of this variable width resistor is to obtain a constant temperature distribution along the sensor element. This reduces the maximum temperature on the sensing element for a given overall resistance—giving the potential to operate at a greater overheat ratio if required. Results have suggested that, for a typical sensor operating at a maximum local temperature of 340° C. (probably somewhat greater than actual operating temperatures), distributing the sensor platform area to achieve a roughly constant temperature distribution gave about 30° C. reduction in maximum local temperature. There is also an additional slight improvement in sensor and diaphragm convection characteristics.

The width of the sensor element is preferably maximised, i.e. the surface area of the sensor exposed to the surrounding air is as large as possible. However, for a given sensor length, increasing the width will reduce the aspect ratio and hence the directional sensitivity of the device. In addition, a target sensor resistance of approximately 5-10Ω and the maximum/minimum fabrication thickness for the metal deposition (typically 0.05 to 1 μm) place additional constraints on the sensor aspect ratio depending on material selection (i.e. resistivity).

The polyimide layer in the diaphragm should be as thin as possible. It significantly reduces heat flow to the substrate and increases convective losses both from the sensor and polyimide (with a marginally greater proportional effect on the sensor than on the diaphragm). Increasing diaphragm width reduces the heat flow to the substrate. Additionally, it increases the convection from the sensor and, to a greater proportion, from the diaphragm. Therefore, increasing diaphragm width will increase the overall sensitivity of the device (through increased sensor and diaphragm convection) but may reduce the frequency response of the device since a greater proportion of the overall convection is from the thermally 'sluggish' polyimide diaphragm.

BRIEF DESCRIPTION OF THE DRAWINGS

Preferred embodiments of the invention will now be described with reference to the accompanying drawings, wherein:

FIG. 1A is a partial plan view, and
FIG. 1B a sectional view of a sensor device according to a first exemplary embodiment of the invention;
FIGS. 2A to 2K show a build sequence for a second embodiment of the invention;
FIGS. 3 to 6 show general layouts for sensor devices according to second and third embodiments of the invention;
FIGS. 8A to 8M show a build sequence for a third preferred embodiment of the invention.

DESCRIPTION OF THE PREFERRED EMBODIMENTS

Figure 2G:
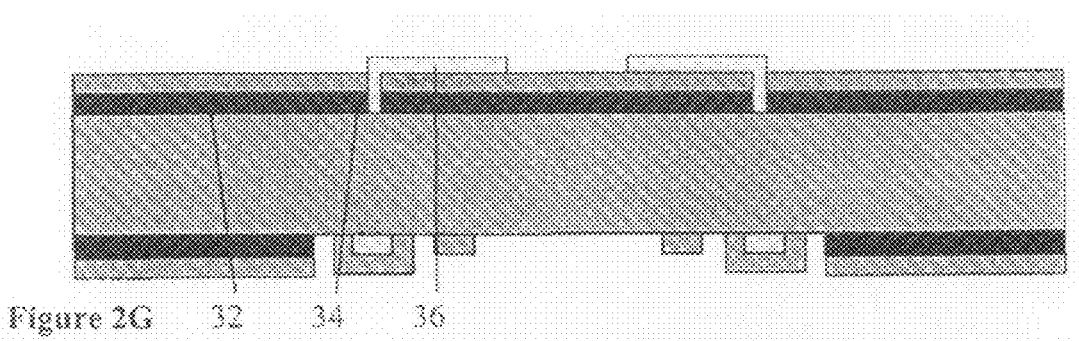

FIGS. 1A and 1B illustrate a first exemplary embodiment of the sensor device 1 of the invention. The sensor device comprises a rectangular tungsten heating element 2 formed on a diaphragm or membrane 4 of polyimide. Membrane 4 is formed over an aperture 6 in a substrate 8, in order to reduce heat losses to the substrate. Gold leads 12 are connected between the ends of sensing element 2 to electrical terminals 14. The diaphragm 4 is composed of first and second layers 41, 42. Gold leads 12 running from the sensing element 2 are enclosed between layers 41, 42 and are therefore buried in the polyimide layer to improve robustness and reduce lead convective losses.

Leads 12 terminate at each terminal 14, which comprises a pillar of doped silicon. The leads 12 are terminated by means of vias 121 (herein termed: vias1) extending through diaphragm 4 to contact pillar 14. Similarly leads 12 are connected to the sensing element 2 by means of vias 122 (herein termed: vias2) extending through diaphragm 4. The pillar is isolated from the remaining silicon substrate by a surrounding trench 16 created using deep reactive ion etching (DRIE). There is a minimum trench width (G in FIG. 1) due to limitations of the DRIE apparatus used, which restricts the aspect ratio of trench 16 to about 10:1. Therefore, for a typical 425 micron thickness wafer the minimum trench width (G) will be about 43 microns. Aperture 6 formed beneath membrane 4 is formed by DRIE at the same time as trench 16.

Membrane 4 supports the element 2 mechanically whilst providing thermal and electrical isolation from the silicon substrate. Electrical connection to the resistor element 2 is made through metal tracks 12 running between the layers of the membrane sandwich structure. Routing of the electrical connections in this way helps reduce convective heat losses from the leads themselves. Electrical connection from the front to the back of the device is made by a system of 'pillars' (such as pillar 14) cut out from the silicon substrate.

A highly conductive doped silicon substrate is used to minimise series resistance of the through-wafer interconnects.

Use of deep reactive ion etching (DRIE) allows the thermal isolation cavities, interconnections pillars and separation of individual devices to be carried out in a single step.

Thus, problems with reliable electrical connections to the sensor have been addressed by using an electrically conductive doped silicon substrate material and making electrical connections on the back of the wafer. A concept of the invention is that through wafer interconnects are fabricated from the silicon substrate itself. This is achieved using deep reactive ion etching (DRIE) to cut isolation trenches around sections of the substrate leaving these sections or pillars mechanically attached to the underside of the membrane only. The isolation trenches are cut as the last stage of the fabrication process, and the resulting structures are robust enough to survive the subsequent packaging stage whereupon a carrier structure would provide a more rugged mechanical support to the free ends of the interconnects. Electrical connection is made through vias in the membrane layer from the tops of the pillars to metal tracks leading to the sensor resistor. The interconnects are sandwiched between layers of the membrane and are thermally and electrically isolated to some degree from both the substrate and the fluid under inspection.

Resistivities for the As-doped silicon are between $1 \times 10^{-6}$ and $40 \times 10^{-6}$ $\Omega m$. Anticipated connecting pillar in-plane widths and lengths will be of the order of 250 to 500 microns to minimise overall pillar resistance. For a wafer thickness of 425 microns these dimensions will give pillar resistances of $0.272_1$ and $0.068$ $\Omega$ respectively for the maximum quoted doped silicon resistivity of $40 \times 10^{-6}$ $\Omega m$. The gold lead resistances are typically about $0.5\Omega$ for a lead thickness and width of 0.5 and 30 microns respectively.

Target resistances for the device when cold are from 5 to $10\Omega$. For given connecting pillar and gold lead geometric characteristics this gives target sensor element resistances. The length of the sensor (L) is currently anticipated to be 1 mm. The sensor thickness can be then be calculated for each specific sensor aspect ratio ($L/W_S$).

The minimum polyimide thickness that can be easily processed is approximately 3 microns. Since at least two layers of polyimide will be applied to submerge the leads then the minimum diaphragm thickness possible will be 6 microns. Alternative manufacturing using silicon nitride or silicon oxide in place of at least one layer of polyimide is possible. Silicon nitride/oxide layers can be manufactured much more thinly than polyimide layers.

Protection of the polyimide upper surface can be achieved with a thin layer of silicon nitride or silicon oxide, which will protect from both abrasion and water absorption problems. The thermal characteristics of this layer would have little effect on the overall performance of the device.

Tungsten is used for the sensing element for a number of reasons:
  Gold is difficult to pattern accurately. Wet-etched gold sensor element edges can become highly irregular and undercut which often leads to local temperature hot spots and decreased reliability.
  Tungsten can be conveniently patterned using a dry-etch resulting in much more accuracy and consistent quality.
  Tungsten has an higher temperature coefficient of resistance (TCR) compared to gold (approximately 0.005 compared to 0.004).
  Tungsten is physically more abrasion resistant.
  Tungsten has a reasonable resistivity (about twice that of gold) compared to alternative materials such as titanium.
  Tungsten was used for the heating resistor elements as it has a similar TCR to titanium but a much lower resistivity allowing low resistance, high aspect ratio films to be formed from thinner metal layers. In addition tungsten can be etched with much greater dimensional accuracy giving a more consistent device resistance; an important factor to consider both for mass production and for setting up of anemometry equipment.

As regards thickness limits for the tungsten sensor element for the defined 5-10$\Omega$ resistance limits, for aspect ratios of less than 5, the sensor thickness should be 0.1 microns and below even for the minimum target resistance of 5$\Omega$. It was felt that 0.1 micron presented a realistic minimum sensor thickness for reliable processing. Therefore, it is likely that a lower aspect ratio limit of 5 to 10 exists for a sensor element manufactured using tungsten.

A sensor element aspect ratio of at least 10:1 is required to achieve reasonable directional sensitivity, for an anemometry device. This establishes the maximum sensor element mean width as 100 microns given a sensor length of 1 mm. It has been shown that sensor width should be maximised for improved sensitivities and therefore 100 microns will be the baseline sensor mean width. The sensor element should be between 100 and 200 nanometers thick (for tungsten construction) depending on target overall device resistance. These thicknesses and platforms are straightforward to manufacture.

A variety of sensor element geometries are possible, including a horseshoe design or U-shaped design. Different aspect ratios of heating element, for example 2, 5, 10, 20, 50 and 100 may be used with different diaphragm widths of for example 20 and 50 microns. The width of the sensor element may vary along the sensor length to achieve more uniform temperature distribution. The sensor length may be between 500 μm and 1000 μm.

FIGS. 3 to 6 show the general layout for the final design of the hot film sensor devices.

Referring now to FIG. 2, this shows a fabrication sequence for a second embodiment. The second embodiment incorporates a membrane comprising a composite 'sandwich' structure using silicon oxide/nitride layers around a core of polyimide, which allows a thinner membrane to be fabricated without sacrificing mechanical stiffness or strength. Silicon oxide and nitride are proposed as materials for the outer skins of the sandwich structure as both have a higher elastic modulus than polyimide combined with a similar or marginally lower thermal conductivity. Both materials could be deposited by low pressure chemical vapour deposition (LPCVD) at a temperature of only 300° C., which did not present any process compatibility issues. The structural stiffness of a sandwich structure based on these materials is much greater than that of a simple polyimide membrane. The membrane thickness is reduced to around 6-7 μm giving a large reduction in its thermal mass. In addition the multi-layer membrane structure simplifies fabrication of the electrical interconnection system. The resilience of the membrane is improved by the use of a sandwich construction as no vias would penetrate its full thickness at any point and any apertures in the facing layers receive some stress relief and toughening from the polyimide core.

A fabrication sequence was developed for the second embodiment as shown in FIGS. 2A-2K, as follows.

FIG. 2A: Silicon wafer 20 250 μm thick, resistivity 0.0001-0.004 $\Omega$cm is provided. A wafer thickness of 250 μm was selected as it represented a compromise between a short through thickness distance (for lower resistance) and ease of wafer handling (wafers of less than 150 μm thickness tend to be very fragile).

FIG. 2B: Deposit 0.2 μm silicon oxide film on both faces, the top film 22 being a base layer for a membrane 23, and the bottom film 24 providing a mask.

FIG. 2C: Etch oxide layer 24 on reverse to expose silicon as at 26.

FIG. 2D: Deposit a chromium adhesion layer, followed by a 1 μm gold layer on exposed silicon 26. The gold/chromium layer is etched to provide electrical terminal contacts 28.

FIG. 2E: Deposit a 6 μm polyimide layer 30 on the reverse side and selectively etch to form a DRIE mask (also protects back of wafer during subsequent process stages).

FIG. 2F: Deposit 6 μm polyimide layer 32 on front face to form a second layer of the device membrane 23. Etch vias 34

(Vias 1) for electrical interconnects through polyimide and oxide, layers 22, 32 from heating elements to conductive pillars.

FIG. 2G: Deposit metal and form sensor element interconnects 36; these comprise a 1 μm gold layer with chrome adhesion layers above and below the gold layer.

Figure 2H:
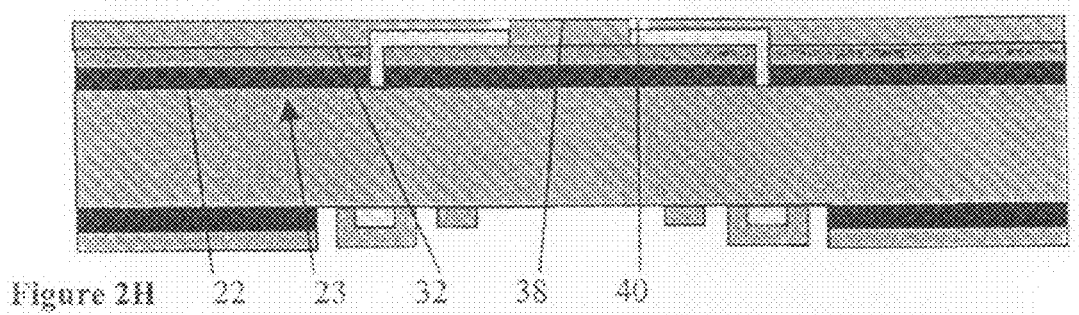

FIG. 2H: Deposit 1.0 μm silicon nitride layer 38 onto top face. This forms the third and abrasion resistant top layer of the membrane 23. Vias (Vias 2) are etched as at 40 through layer 38 for making connections between the sensor element and the interconnection tracks 36.

Figure 2I:
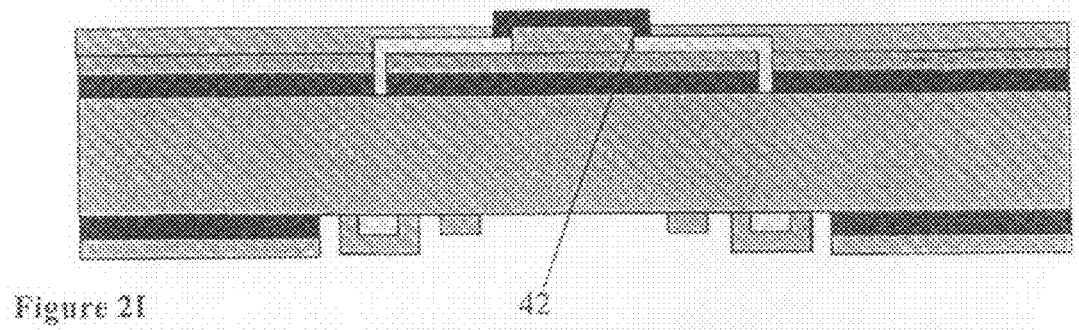

FIG. 2I: Deposit tungsten layer 0.1 μm thick and etched to form sensing element 42.

Figure 2J:
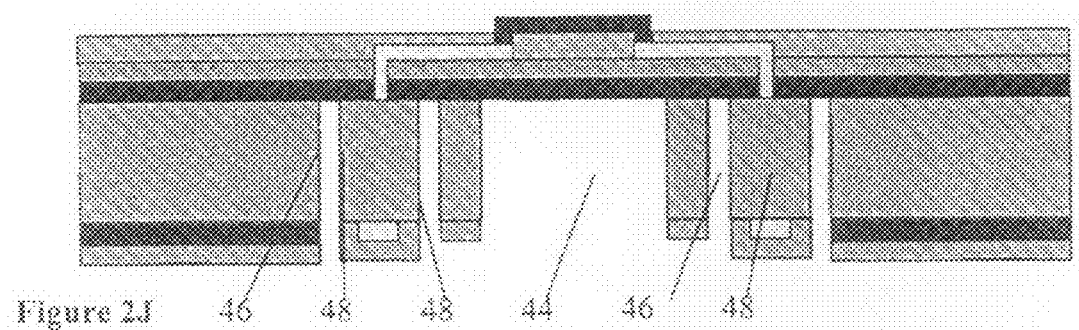

FIG. 2J: Etch silicon from back by DRIE to form thermal isolation cavity 44 beneath the membrane 23 and sensor element 42, and trenches 46 to define conductive pillars 48, which form through wafer interconnects. The pillars need to be compact to give a high device per wafer count, but still large enough to give a low series resistance and allow connections to be made manually if required. Square pillars of 450 μm side were chosen as a compromise between these competing factors. This gave an estimated series resistance of 0.0012-0.0494Ω depending on the resistivity of the substrate. The isolation trench width was set at 50 μm as this represented a 5:1 aspect ratio and would be well within the capabilities of the DRIE apparatus.

Figure 2K:
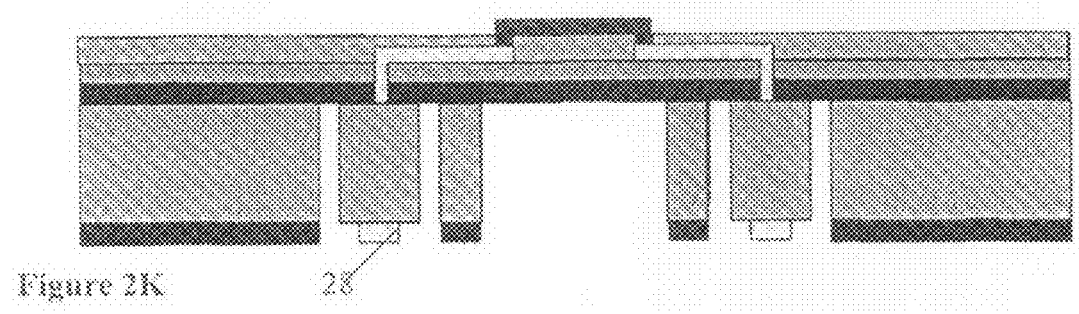
Figure 6:
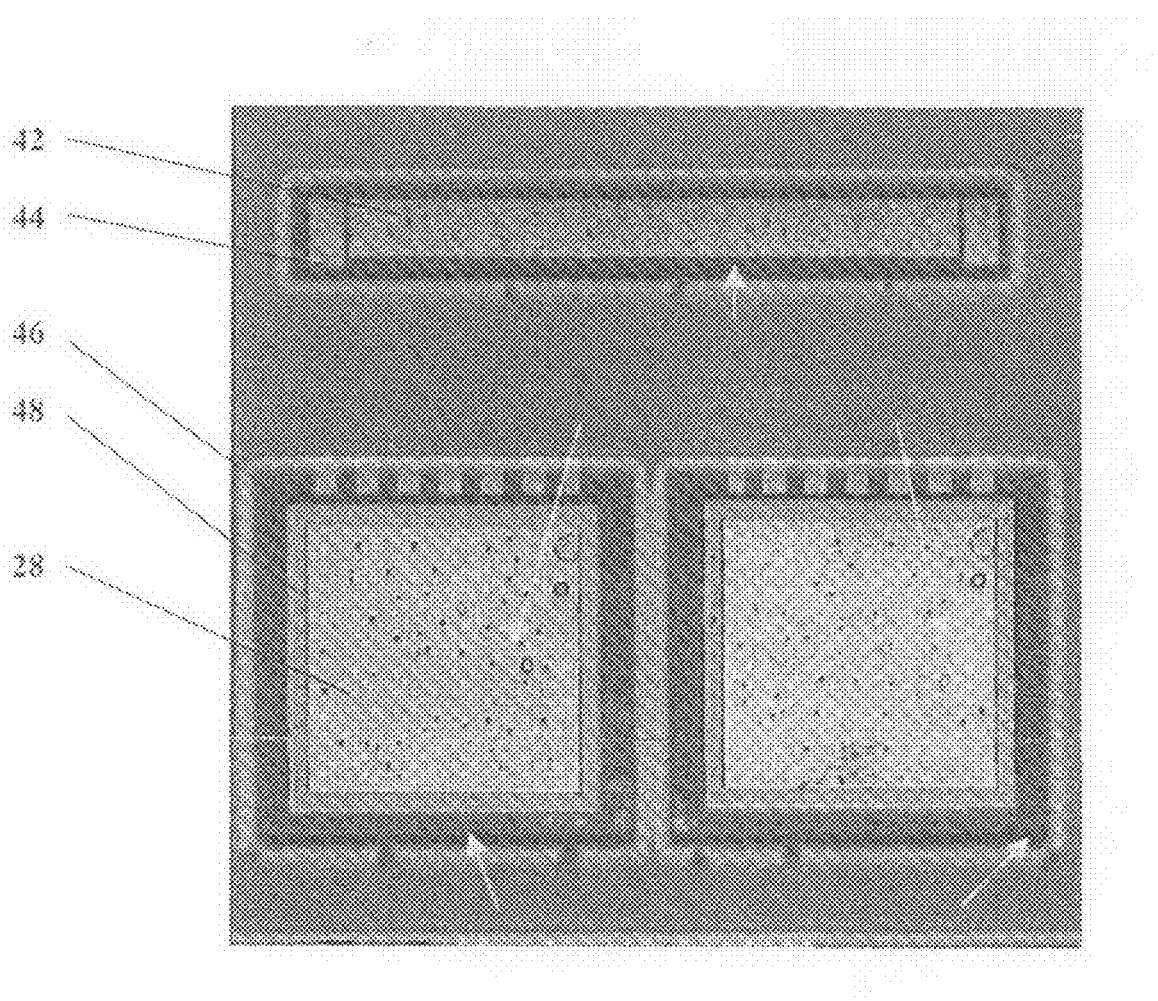

FIG. 2K: Remove polyimide DRIE mask 30 from back side to expose metal contacts 28 at the base of pillars 48.

To give a degree of redundancy 10 identical devices 1 were fabricated on a chip 50 as shown in FIGS. 3 and 4. It was considered desirable that all chips should be designed on a common footprint with a standardised pin-out so that packaging and integration would be simplified. After allowing some silicon around the devices for mechanical robustness and ease of handling the dimensions of the 10 device chips are 13500 μm long×1500 μm wide×250 μm thick. The general device layout is set out with the pillars 48 side by side on the lower half of the device (FIG. 4) and the resistor 42 and membrane in the upper half (FIG. 3). The interconnecting tracks 36 run from below the end of the resistor to the tops of the pillars. This layout places the 20 interconnect pillars 48 in a regularly spaced line along the base of the device regardless of the variant satisfying the requirement for a common package.

It was found the interconnection leads 36 may contribute over 3Ω to the total series resistance of the devices. Two courses of action were taken to reduce this figure to a more acceptable level. Firstly, the thickness of gold in the interconnection leads was increased to about 1 μm. Further increases in thickness were considered undesirable as this would produce a large step in the top surface of the device, which could potentially interfere with formation of the resistor element. In addition to using thicker metal, the interconnection leads were designed to provide wide, slotted tracks 52, as shown in FIG. 5, to relieve stress and avoid delamination. This reduced their resistance to less than 0.2Ω.

Referring to FIG. 5, it may be seen the connections of conductors 36 to pillar 48 is by means of vias 34 (via1), arranged as rectangular matrices 54 of vias, as shown 8×8 arrays. Similarly the connections of conductors 36 to sensor element 42 is by means of vias 40 (vias2) arranged as rectangular matrices 56, as shown 5×9 arrays. Larger or smaller arrays may be provided. The size and shape of each via may be varied. The effect of the vias is to constrict the flow of heat from the sensor device. The small cross section of the vias beneath the resistor form a constriction and helped to reduce heat loss through the tracks by thermal conduction. The constriction in the electrical interconnecting tracks reduces the loss of heat from the sensor element by conduction. The conduction of heat from the element 42 to the tracks 36 is reduced by the use of via connections 34, 40 through the upper layers of the membrane to connect the tracks and resistor. With a cross-sectional area much smaller than the interconnecting tracks and resistor this results in a constriction in the vertical plane rather than horizontal. Thermal analysis showed that a thinner membrane of low thermal conductivity material would improve the dynamic response of the devices by lowering the thermal mass of the membrane and reducing heat loss to the substrate by conduction.

Physical support was provided by a range of carriers including flexible PCB and commercial Pyrex based systems. Electrical connections to the 'outside world' were made using solder, wire bonding, anisotropic conductive adhesives, anodic and thermocompression bonding. This flexibility of integration allowed devices to be adapted for operation in a wide range of test facilities. The parasitic series resistance (i.e. the resistance of the device over and above that of the sensing element itself) of the devices was less than 1Ω ohm for the final design. Frequency response for the devices was of the order 15-30 kHz and sensitivity was up to 900 mV/Pa.

Physical examination of the devices of the second embodiment revealed a problem with the gold pads 28 on the bottom of the interconnect pillars 48. The external electrical connections for the hot film devices take the form of 400 μm square gold contacts deposited on the bottom end of the 450 μm square through-wafer interconnection pillars. As the adhesion of gold to silicon is poor it is normal practice deposit a thin layer (50-100 nm typically) of a second metal with better adhesion characteristics (normally chromium or titanium) and then deposit gold onto this layer. Gold is known to diffuse easily into silicon and it is possible that temperature driven diffusion may have caused the formation of a gold/silicon alloy layer. To provide the necessary ohmic contact a tungsten adhesion layer was introduced to replace the chrome as it is known to be more resistant to diffusion (see FIG. 8D below).

Gold via caps were used to improve the coverage of the resistor element over the step caused where the interconnection tracks ran under the resistor and to increase the thickness of metal within the vias to reduce their electrical resistance. The effects of undercutting combined with small errors in alignment (1-2 μm in some cases) led to poor step coverage at the lead/element interface. The cap mask was designed to give a large overlap. This improved device continuity and increased the tolerance of the process to over-etching and mask misalignment.

It was noted that a combination of long etch times (>20 mins in some cases) and the aggressive nature of the etchant (30% hydrogen peroxide solution) led to sections of the resist becoming detached from the wafer. The loss of resist during the etch process resulted in resistors being etched for a variable period. This caused the tungsten to have a variable thickness and hence a variable resistance. To combat this problem a thin layer of gold (100-200 nm) was deposited on top of the tungsten. The gold layer was etched to form a 'hard mask' in the desired element pattern as gold is resistant to the tungsten etchant. Subsequent to the formation of the resistor element the gold covering the resistors was partially etched away to leave via caps.

Inspection of the second embodiment showed that the silicon nitride layer 38 used to form the top surface of the membrane was becoming cracked and crazed during the processing stages subsequent to its deposition. Silicon oxide film was instead used for the top surface of the membrane as this too could be deposited at 300° C. (by plasma enhanced chemical vapour deposition (PECVD)) and had a similar thermal conductivity to the silicon nitride it replaced. PECVD grown silicon oxide films have a much lower intrinsic stress than silicon nitride.

Figure 7A:
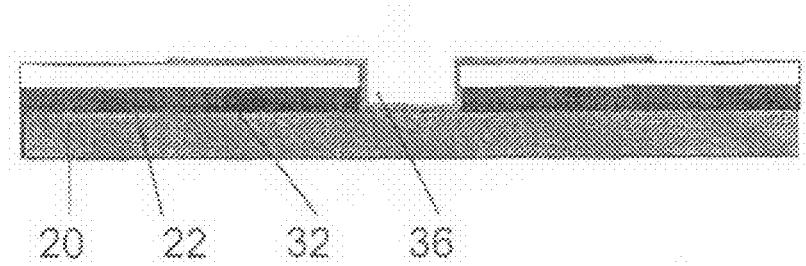
FIGS. 7a to 7d show steps in formation of Via1, that is an array of vias between interconnection tracks and an electrical terminal formed by a conductive pillar.

Poor coverage by deposited metal of the side walls of the vias in the polyimide and silicon oxide layers above the pillars was identified as a second potential cause of high resistance connections. In the second embodiment process the vias at the resistive element in the polyimide and oxide layers (Via1) were formed using the same mask. It was possible for the oxide layer to be over-etched compared with the polyimide and this could lead to the polyimide overhanging the oxide. The side walls of the vias would then receive poor coverage when the interconnect metal was subsequently deposited giving a high resistance or open-circuit connection as shown in FIGS. 7a-d:

FIG. 7a Via1 formed using same mask. If both layers are perfectly etched a good connection can be obtained.

Figure 7B:
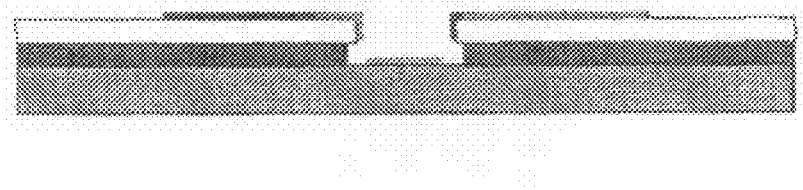

FIG. 7b Oxide over-etched. Poor contact as overhanging polyimide leaves no sidewall for metal to deposit onto.

Figure 7C:
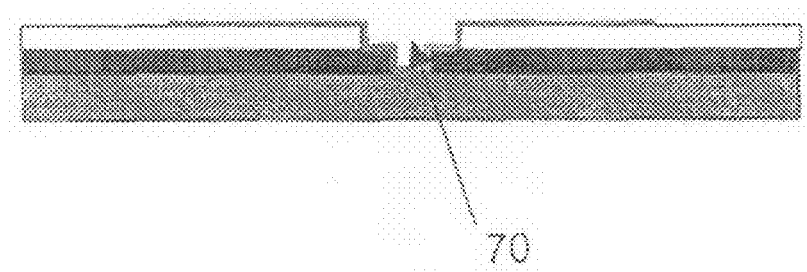

FIG. 7c Second Via 1 mask gives stepped profile 70, eliminates undercutting.

Figure 7D:
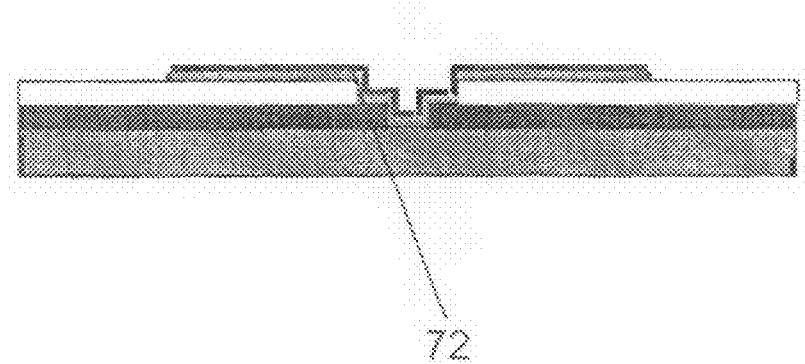

FIG. 7d Capping layer 72 thickens Via1 metal, improves step coverage and lowers resistance.

A Via1 mask was designed that allowed smaller vias to be formed in the oxide layer. This resulted in a stepped profile as shown in FIGS. 7c-d. Subsequent deposition of metal onto the stepped faces of the vias gave improved coverage and resulted in a more reliable contact onto the underlying tungsten pads. A capping layer was also introduced at this stage to thicken the metal over the vias and further improve step coverage. Taken together these modifications reduced the additional series resistance from the top side ohmic contact and Via1 to around 0.05-0.1 ohms and allowed them to be formed reliably.

Via2, forms the electrical connection between the top side interconnect tracks and the resistive sensing element itself. The mask for Via2 was designed to give a large number of small vias. This had the effect of increasing the total length of the perimeter of the connection, reducing its effective cross-sectional area normal to the wafer surface, resulting in a reduction in series resistance.

The above improvements were incorporated into a third embodiment, as will now be described.

Third Embodiment Device Build

The fabrication sequence was modified in the light of the above, and the third embodiment is shown in FIG. 8 as the following sequence: Similar parts to those of FIG. 2 are denoted by the same reference numeral.

FIG. 8A Silicon wafer 20 250 μm thick, heavily doped with As-resistivity 0.0001-0.004 ohm cm is provided.

FIG. 8B Deposit 0.3 μm silicon oxide film 24 on rear face only.

FIG. 8C Etch oxide layer 24 on reverse to expose silicon substrate as at 26.

FIG. 8D Deposit a 0.3 μm tungsten adhesion/diffusion barrier layer 80, followed by a 0.5 μm gold layer 81 on exposed silicon substrate 26. Etch to form back contacts 28.

FIG. 8E Deposit 0.1 μm tungsten, etch to form top ohmic contacts 82, To improve conductivity, the tungsten layer was deposited on the top side of the wafer prior to any other processing on this face, i.e. before any significant contamination could be introduced. The tungsten layer was patterned to give 400 μm square contact pads on top of the interconnect pillars matching the back-side connection pads. The process stage subsequent to the formation of the tungsten pads was the addition of a polyimide layer. As this process was performed at 360° C. in nitrogen for 50 minutes it also served to sinter the tungsten-silicon junction at the same time, ensuring the formation of a reliable ohmic contact. The tungsten provided a metal-to-metal contact when the tracks were subsequently deposited and this type of junction is generally less susceptible to contamination. The addition of tungsten ohmic contact pads gave consistently good results and resistances between the pads were generally of the order 0.5 ohms prior to pillar cut-out once the process was introduced into the standard build sequence.

FIG. 8F Deposit 6 μm polyimide layer 30 and etch to form DRIE mask (also protects back of wafer during subsequent process stages).

Figure 8G:
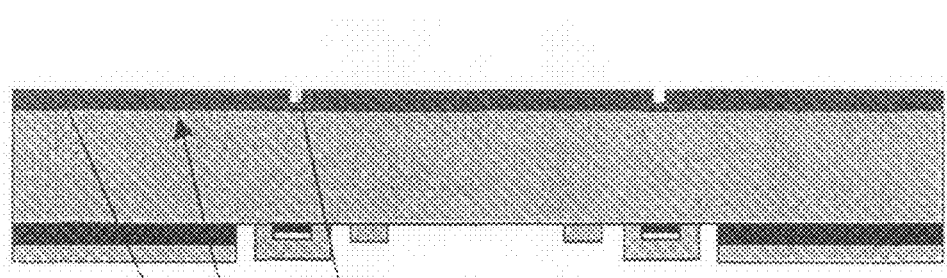

FIG. 8G Deposit 0.6 μm silicon oxide layer 22 by a PECVD process at 300° C. to form the base layer of membrane 23. Etch 1st stage 84 of Via1 at the remote ends of the interconnects.

Figure 8H:
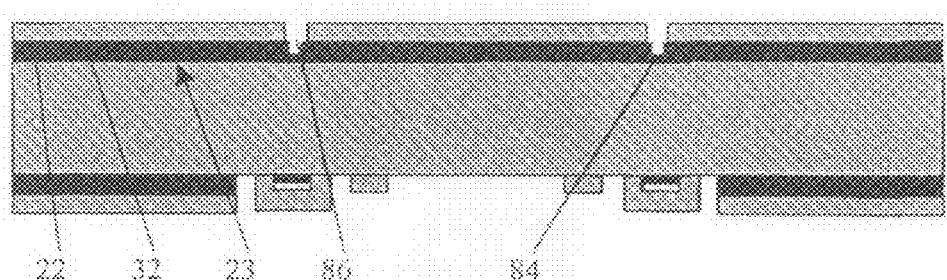

FIG. 8H Deposit 6 μm polyimide layer 32 by a spin on process and oxidation at 360° C., etch 2nd stage 86 of Via 1, wider than stage 84 to give a stepped configuration.

Figure 8I:
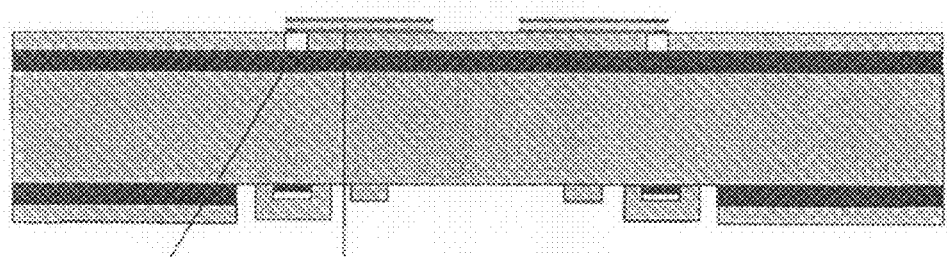

FIG. 8I Deposit 5 layers to form heating resistor interconnects 88 and Via1 caps 90. Layers are 0.1 μm Cr, 1 μm Au, 0.2 μm Cr, 0.5 μm Au, 0.1 μm Cr.

Figure 8J:
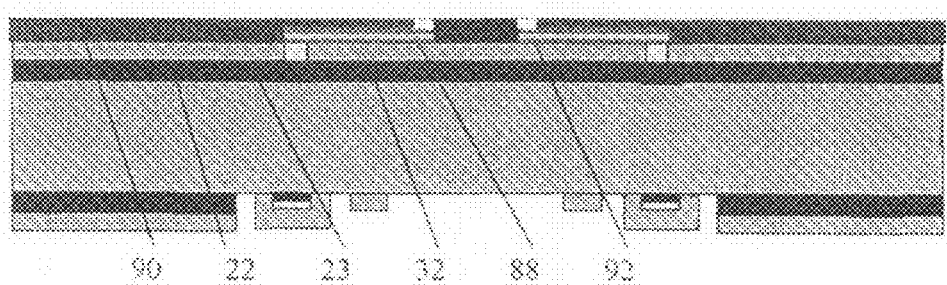

FIG. 8J Deposit 1.0 μm silicon oxide 90 on top face and etch Via2 92 at the near ends of the heating sensor resistor. The silicon oxide forms a third layer of the diaphragm and gives the compliant polyimide layer a required level of stiffness for use. The silicon oxide provides an abrasion resistant layer, and gives additional thermal and electrical insulation.

Figure 8K:
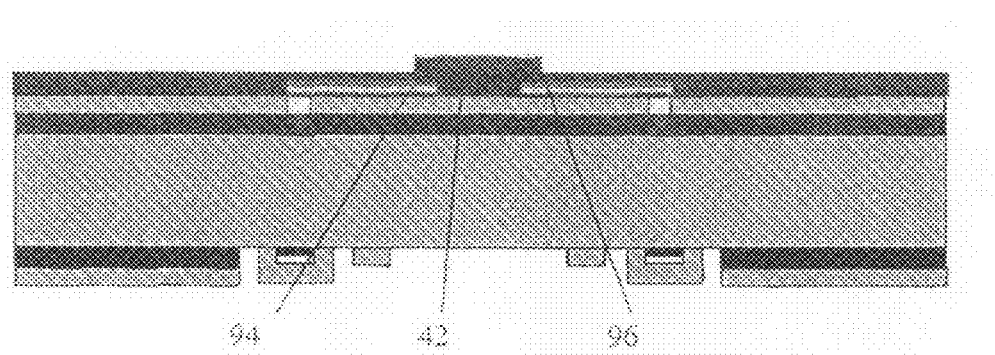

FIG. 8K Deposit tungsten resistive heating element 42 and via 2 caps 94—this is etched to the desired size. The ends of the tungsten strip over the Vias 2 are covered with gold strips 96, for additional protection and gold.

Figure 8L:
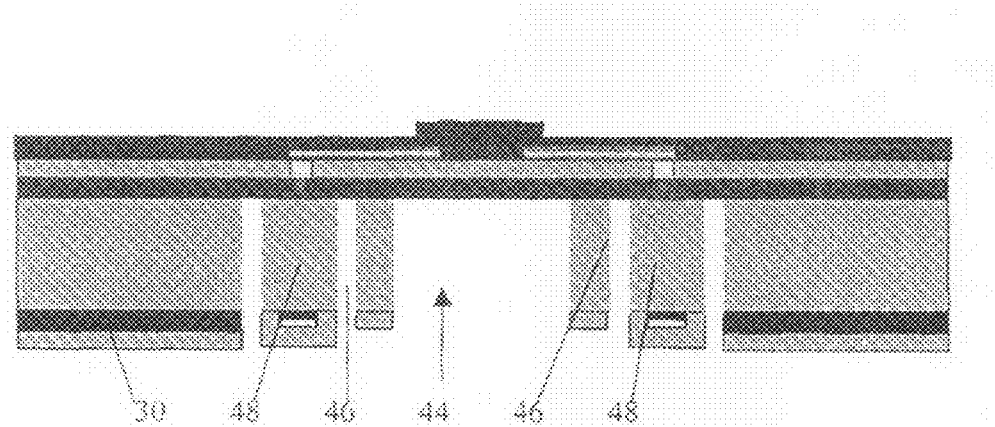

FIG. 8L Etch silicon from back to form thermal isolation cavity 44 and trenches 46 in order to form conductive silicon pillars 48.

Figure 8M:
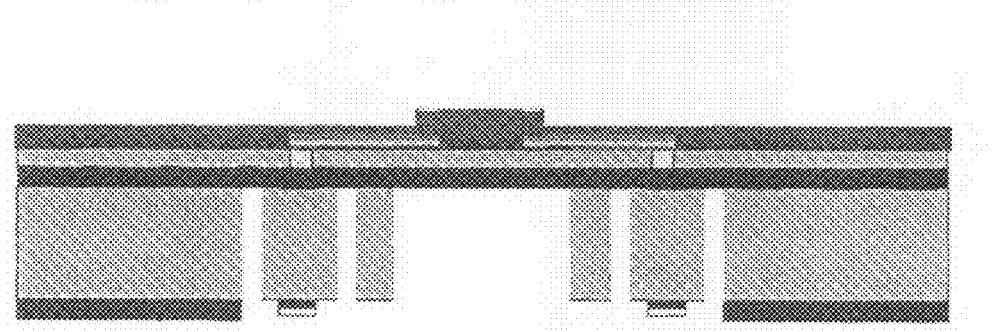

FIG. 8M Remove polyimide DRIE mask 30.

This third embodiment reduced typical parasitic resistances to less than 1.5 ohms on all devices.

MODIFICATIONS

Whilst a thin membrane offers high performance due to its low thermal mass it is also relatively fragile. It is suggested that this factor will become increasingly important as designs move towards a production/flight worthy state where exposure to significant mechanical loads, (e.g. impact events, vibration, flexure and large dynamic pressure differentials) would have to be tolerated. A method is needed to reinforce the membrane without sacrificing its low thermal conductivity properties. It may be possible to fill the cavities with a low thermal conductivity material. Such materials could include low density composites (e.g. glass microspheres in a polymeric matrix), spin-on nano-porous glasses (e.g. Honeywell NANOGLASS® E) or aerogels, for example hydrophobic silica aerogels. Alternatively a thicker, low thermal conductivity, core material could be used on a sandwich structure membrane. Ultimately it might be possible to remove the need for a cavity altogether by fabricating the sensor element directly onto a very low thermal conductivity insulating layer, aerogels and spin-on glasses might again provide a possible solution here.

Sensor operation at a large overheat ratio is desirable as this can give higher sensitivity. Rather than using a passivating overlayer to allow higher overheat ratios to be used it may be possible to use an alternative material for the sensor resistor. Nickel shows good resistance to oxidation at high temperatures and so might be less prone to degradation when run at large overheats. In addition nickel has a higher TCR than tungsten (0.66%/° C. c.f. 0.46%/° C.). The resistivity of nickel is similar to that of tungsten (Ni $6.2 \times 10^{-8}$ Ωm, W $7 \times 10^{-8}$ Ωm) and so layers of a similar thickness could be used.

It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

The invention claimed is:

1. A sensor device comprising:
   a substrate;
   a thermally and electrically insulative diaphragm having a plurality of layers, wherein the diaphragm is mounted on an upper side of the substrate over an aperture or recess in the substrate;
   a sensor element formed on an upper surface of the diaphragm;
   electrically conductive means mounted between layers of the diaphragm and extending from the sensor element; and
   electrical terminals formed within the substrate, wherein the electrical terminals are sandwiched between trenches and have a lower end connected to a lower side of the substrate and an upper end connected to the sensor through the electrically conductive means.

2. The device as claimed in claim 1, wherein the sensor element is formed of tungsten or nickel.

3. The device as claimed in claim 1, wherein the diaphragm includes a layer of one of the following: polymer material, low density composites, spin-on nano-porous glasses and aerogels.

4. The device as claimed in claim 1, wherein the diaphragm comprises an uppermost layer being an abrasion resistant material.

5. The device as claimed in claim 1, wherein the electrically conductive means is widened in regions spaced from the sensor element.

6. The device as claimed in claim 1, wherein the sensor element is connected to the electrically conductive means by an array of vias that extend from each end of the sensor element through at least one layer of the diaphragm to the electrically conductive means.

7. The device as claimed in claim 6, including a cap layer of electrically conductive material formed over said vias.

8. The device as claimed in claim 1, wherein said terminals are provided by at least one conductive pillar formed by cutting away substrate material so as to provide said at least one conductive pillar, extending from the upper part of the substrate to the lower substrate side.

9. The device as claimed in claim 8, wherein each pillar is connected to the electrically conductive means at the upper part of the substrate by an array of vias.

10. The device as claimed in claim 9 wherein the diaphragm includes a plurality of layers, and said vias extended through the plurality of layers in a stepped configuration.

11. The device as claimed in claim 1, wherein the substrate is formed of strongly doped silicon.

12. A sensor device comprising:
    a substrate formed of electrically conductive material;
    a thermally and electrically insulative diaphragm mounted on an upper side of the substrate over an aperture or recess in the substrate;
    a sensor element formed on the upper surface of the diaphragm;
    electrical terminals on a lower side of the substrate and connected to the sensor element by electrically conductive means;
    wherein said terminals are stand-alone conductive pillars comprised of substrate material and are sandwiched between trenches within the substrate, wherein the terminals extend from the electrically conductive means to the lower side of the substrate.

13. The device as claimed in claim 1, wherein the sensor element is a heating element.

14. The device as claimed in claim 13, wherein the substrate is formed of strongly doped silicon.

15. The device as claimed in claim 4, wherein the abrasion resistant material includes silicon dioxide.

16. The device of claim 1, wherein the trenches extend along a length of the electrical terminals from the upper end to the lower end.

17. The device of claim 1, wherein the electrical terminals are stand-alone conductive pillars that are isolated from other portions of the substrate through the trenches.

18. The device of claim 1, wherein the electrical terminal is an isolated section of the substrate.

19. The device of claim 12, wherein the trenches extend along a length of the electrical terminals from the upper end to the lower end.

20. The device of claim 12, wherein the electrical terminals are stand-alone conductive pillars that are isolated from other portions of the substrate through the trenches.

21. The device of claim 12, wherein the electrical terminal is an isolated section of the substrate.

* * * * *